(12) United States Patent
Le Grand et al.

(10) Patent No.: US 9,544,871 B2
(45) Date of Patent: Jan. 10, 2017

(54) DETERMINING AND ALIGNING A POSITION OF A DEVICE AND A POSITION OF A WIRELESS ACCESS POINT (AP)

(71) Applicant: Google Inc., Mountain View, CA (US)

(72) Inventors: Etienne Le Grand, Mountain View, CA (US); Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 14/509,189

(22) Filed: Oct. 8, 2014

(65) Prior Publication Data

US 2015/0237595 A1    Aug. 20, 2015

Related U.S. Application Data

(60) Provisional application No. 61/939,960, filed on Feb. 14, 2014.

(51) Int. Cl.
*H04W 4/04* (2009.01)
*H04W 88/08* (2009.01)
*H04W 64/00* (2009.01)
*G01S 19/01* (2010.01)
*G01S 5/02* (2010.01)

(52) U.S. Cl.
CPC .......... *H04W 64/003* (2013.01); *G01S 5/0252* (2013.01); *G01S 19/01* (2013.01); *H04W 4/04* (2013.01); *H04W 64/006* (2013.01); *H04W 88/08* (2013.01)

(58) Field of Classification Search
CPC ....... G01C 21/16; G01C 21/165; G01S 19/49; G01S 19/39; G01S 19/48; G01S 5/0294; G08B 25/016; G08G 1/20; H04W 4/028; H04W 4/043; H04W 64/00
See application file for complete search history.

(56) References Cited

U.S. PATENT DOCUMENTS 8,688,375 B2 *   4/2014   Funk ................... G01C 21/165
                                                340/995.19
2015/0119086 A1 *  4/2015  Mirowski ............. G01S 5/0252
                                                 455/456.6

FOREIGN PATENT DOCUMENTS

EP           2551695       1/2013
WO       WO2012/106075     8/2012

* cited by examiner

*Primary Examiner* — Ayaz Sheikh
*Assistant Examiner* — Debebe Asefa
(74) *Attorney, Agent, or Firm* — McDonnell Boehnen Hulbert & Berghoff LLP

(57) ABSTRACT

Examples describe systems and methods for iteratively determining a signal strength map for a wireless access point (AP) aligned to position coordinates, positions of a device, and positions of the wireless APs. An example method includes selecting traces and a wireless AP among the traces for which data is indicative of a threshold amount of information to estimate a position of the device and a position of the wireless AP, selecting first characteristics from the traces to remain constant and second characteristics to be variable, and selecting a localization constraint that provides boundaries on the position of the device and the position of the wireless AP. The method also includes performing a simultaneous localization and mapping (SLAM) optimization of the position of the device and the position of the wireless AP based on the localization constraint with the first characteristics held constant and the second characteristics allowed to vary.

18 Claims, 8 Drawing Sheets

DETERMINING AND ALIGNING A POSITION OF A DEVICE AND A POSITION OF A WIRELESS ACCESS POINT (AP)

CROSS REFERENCE TO RELATED PATENT APPLICATION

The present application claims priority to U.S. provisional patent application No. 61/939,960 filed on Feb. 14, 2014, the entire contents of which are herein incorporated by reference.

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

Within examples, traces of data may be received from devices and may include a variety of measurements from multiple different sensors, and collected over time or at various locations. A trace may refer to a sensor log or a collection of data output from sensors on the device over some time period and collected over a number of locations. The traces of data may be used to build a WiFi signal strength map of the number of locations aligned to latitude and longitude or position coordinates. Estimates of WiFi access point (AP) positions can be made based on known locations of where the WiFi scans occurred. An estimates of where the WiFi scans occurred can be made based on known locations of WiFi APs. To solve the problem when both are initially unknown, a simultaneous localization and mapping (SLAM) can be performed to solve both at the same time using received data in the traces. If one of a location of a WiFi AP or locations of WiFi scans are known, then the known data can be held constant while optimizing the other. The received traces can be used to determine relative paths traversed by the devices when collecting the data using dead reckoning, which provides estimates of AP locations and trajectory of the devices relative to each other, and such relative estimates can be aligned with more absolute positions using measurements from GPS.

Thus, within some examples, trustworthy measurements can be accessed first to generate a first estimate of a WiFi signal strength map, and new measurements can be introduced to refine the estimate using the estimate as a starting point to build upon. As each new data is introduced, a current estimate is held constant and used to determine an initial estimate for the new data. Then, a SLAM optimization may be performed to jointly optimize all data without keeping anything constant. Iterations may be performed until all data has been considered.

In one example, a method is provided that comprises receiving traces of data, and respective data is collected by sensors of a device over a plurality of locations and over time periods. A respective trace of data includes received signal strength indication (RSSI) data for a plurality of wireless access points (AP). The method also includes selecting, by one or more processors, a set of traces and a given wireless AP among the traces of data for which data is indicative of a threshold amount of information to estimate a position of the device over the time periods and a position of the given wireless AP. The method also includes selecting first characteristics from the set of traces to remain constant and second characteristics from the set of traces to be variable, selecting a localization constraint that provides one or more boundaries on the position of the device over the time periods and the position of the given wireless AP, and performing, by the one or more processors, a simultaneous localization and mapping (SLAM) optimization of the position of the device and the position of the given wireless AP based on the localization constraint with the first characteristics held constant and the second characteristics allowed to vary. The method further includes based on the optimization, providing an estimate of the position of the device over the time periods and an estimate of the position of the given wireless AP.

In another example, a computer readable memory having stored therein instructions, that when executed by a computing device, cause the computing device to perform functions is provided. The functions comprise receiving traces of data, and respective data is collected by sensors of a device over a plurality of locations and over time periods. A respective trace of data includes received signal strength indication (RSSI) data for a plurality of wireless access points (AP). The functions also include selecting a set of traces and a given wireless AP among the traces of data for which data is indicative of a threshold amount of information to estimate a position of the device over the time periods and a position of the given wireless AP. The functions further include selecting first characteristics from the set of traces to remain constant and second characteristics from the set of traces to be variable, selecting a localization constraint that provides one or more boundaries on the position of the device over the time periods and the position of the given wireless AP, and performing a simultaneous localization and mapping (SLAM) optimization of the position of the device and the position of the given wireless AP based on the localization constraint with the first characteristics held constant and the second characteristics allowed to vary. The functions further include based on the optimization, providing an estimate of the position of the device over the time periods and an estimate of the position of the given wireless AP.

In still another example, a system is provided that comprises one or more processors, and data storage configured to store instructions that, when executed by the one or more processors, cause the system to perform functions. The functions comprise receiving traces of data, and respective data is collected by sensors of a device over a plurality of locations and over time periods. A respective trace of data includes received signal strength indication (RSSI) data for a plurality of wireless access points (AP). The functions also include selecting a set of traces and a given wireless AP among the traces of data for which data is indicative of a threshold amount of information to estimate a position of the device over the time periods and a position of the given wireless AP, selecting first characteristics from the set of traces to remain constant and second characteristics from the set of traces to be variable, and selecting a localization constraint that provides one or more boundaries on the position of the device over the time periods and the position of the given wireless AP. The functions also include performing a simultaneous localization and mapping (SLAM) optimization of the position of the device and the position of the given wireless AP based on the localization constraint with the first characteristics held constant and the second characteristics allowed to vary, and based on the optimization, providing an estimate of the position of the device over the time periods and an estimate of the position of the given wireless AP.

In yet another example, another system is provided that comprises a means for receiving traces of data, and respective data is collected by sensors of a device over a plurality of locations and over time periods. A respective trace of data includes received signal strength indication (RSSI) data for a plurality of wireless access points (AP). The system also includes a means for selecting a set of traces and a given wireless AP among the traces of data for which data is indicative of a threshold amount of information to estimate a position of the device over the time periods and a position of the given wireless AP. The system also includes a means for selecting first characteristics from the set of traces to remain constant and second characteristics from the set of traces to be variable, and a means for selecting a localization constraint that provides one or more boundaries on the position of the device over the time periods and the position of the given wireless AP. The system also includes a means for performing a simultaneous localization and mapping (SLAM) optimization of the position of the device and the position of the given wireless AP based on the localization constraint with the first characteristics held constant and the second characteristics allowed to vary, and based on the optimization, a means for providing an estimate of the position of the device over the time periods and an estimate of the position of the given wireless AP.

These as well as other aspects, advantages, and alternatives, will become apparent to those of ordinary skill in the art by reading the following detailed description, with reference where appropriate to the accompanying figures.

DETAILED DESCRIPTION

Figure 1:
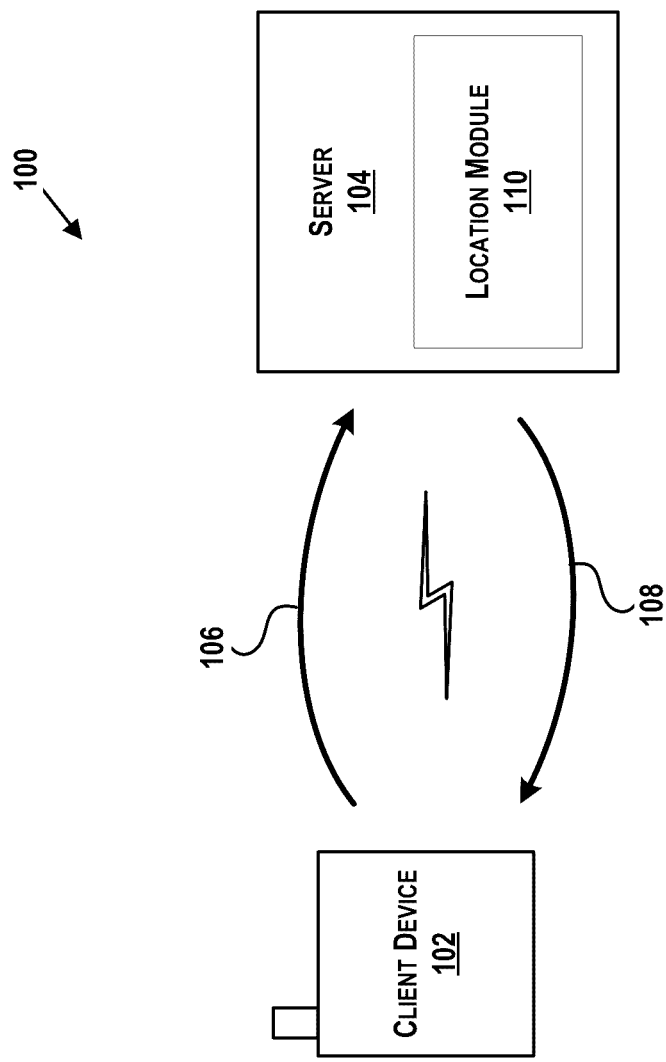
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a number of logs of data or traces of data are received from a number of devices. The data may include a variety of information collected by the devices including outputs of various sensors including GPS, accelerometers, gyroscopes, IMUs, barometers, magnetometers, and WiFi signal strength as just some examples. The traces of data may be processed to estimate a position of wireless access points (APs), and a position of the devices as they traverse a space collecting the data. Examples herein estimate a position of the traces and a position of the APs together. Traces of data that include good data may be used to influence locations of APs and good WiFi data may be used to influence measurements of traces.

It may be desirable to process the received traces of data in an iterative manner so as to use good data first (e.g., data estimated or considered to have a high confidence of accuracy), followed by data considered to have a lower confidence, and so on until all data is considered. Selecting the traces of data that include the good data may be performed in a number of ways. Examples for determining how to select traces for use include whether GPS and dead reckoning in the traces agree, whether a number of GPS readings is above a threshold, whether a number of WiFi measurements that have seen a WiFi AP is above a threshold, whether a trace has deadspots or inconsistent GPS readings, whether a trace has a threshold number of magnetometer data, whether a trace has a threshold number of barometer data or changes in barometer readings, whether orientation of a device relative to a user has changed based on the data to makes dead reckoning measurements inaccurate, whether gyroscope data indicates the device moving in circles, confidence values associated with estimates of locations of APs and traces, whether a number of measurements in which WiFi AP is seen is above a threshold, whether a WiFi AP location changes over time, whether a length of a trace is above a threshold, whether a trace complies with a known or estimated gyroscope bias, whether a trace complies with an average step length, whether measurements from an AP come on a range of signal strengths, whether dead reckoning measurements indicate an average absolute rotation per step below a threshold, whether a time between steps is about constant, or any combination of these criteria.

In addition, within traces, WiFi data may also be filtered for processing based on a number of criteria. Examples criteria include a number of times the AP is seen in traces, a number of days the AP is seen, or whether a signal strength indicates a diffuse map.

After selecting traces for processing, a position of the selected traces can be optionally determined using a global optimization algorithm, such as Viterbi. A set of characteristics from traces, APs, and magnetic field maps can be set as "constant" so as to reduce a dimensionality of the processing. A set of constraints can be selected to use, so as to select constraint easier to optimize in first iterations, and finer in last iterations. The non-constant characteristics of the traces, APs, and magnetic field maps can then be optimized by minimizing a cost function generated by the selected constraints.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
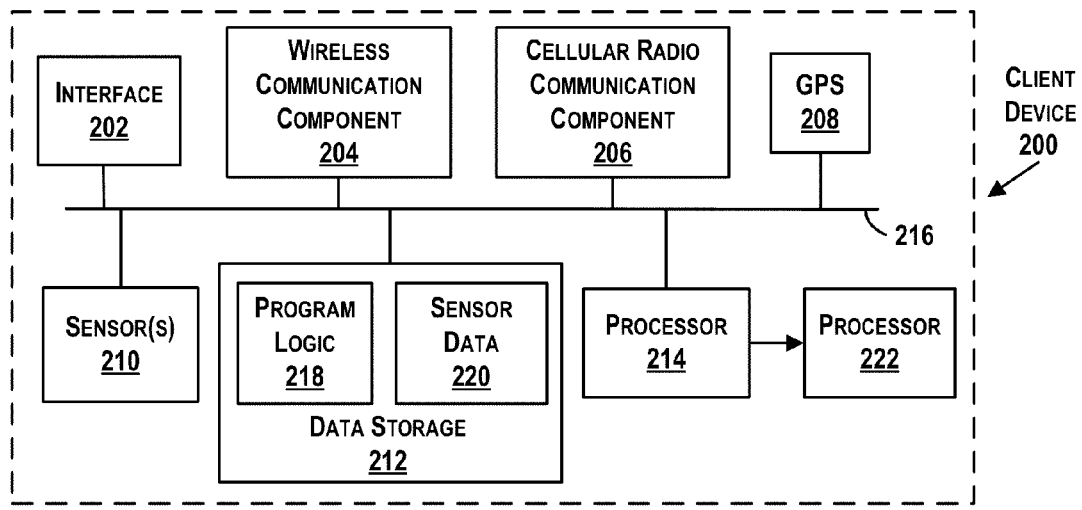
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
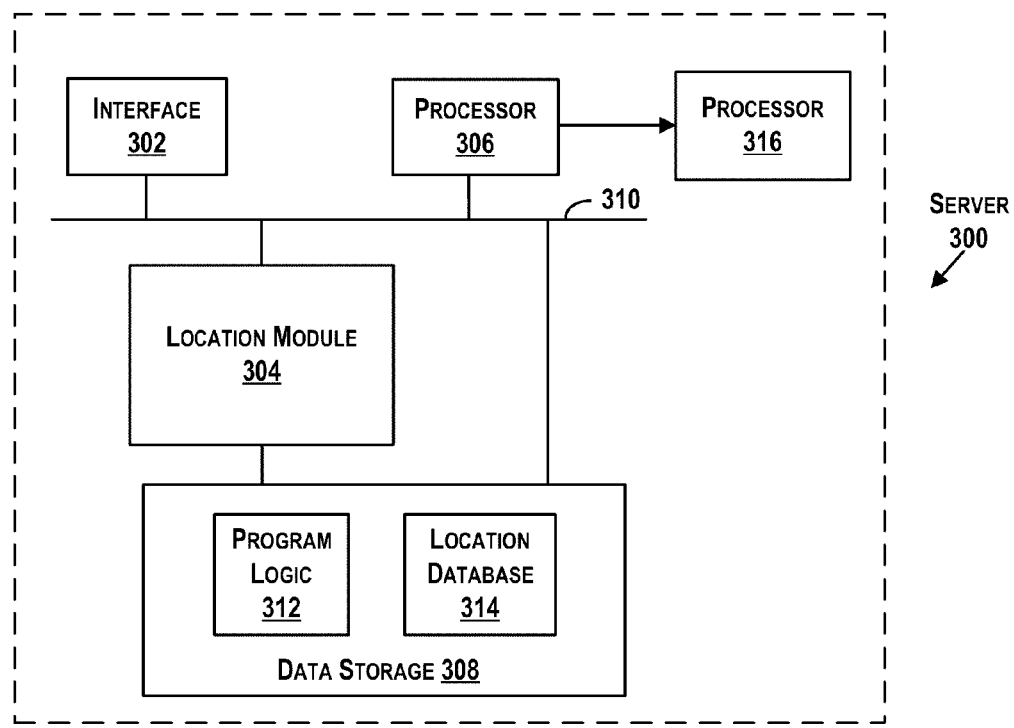
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

Figure 4:
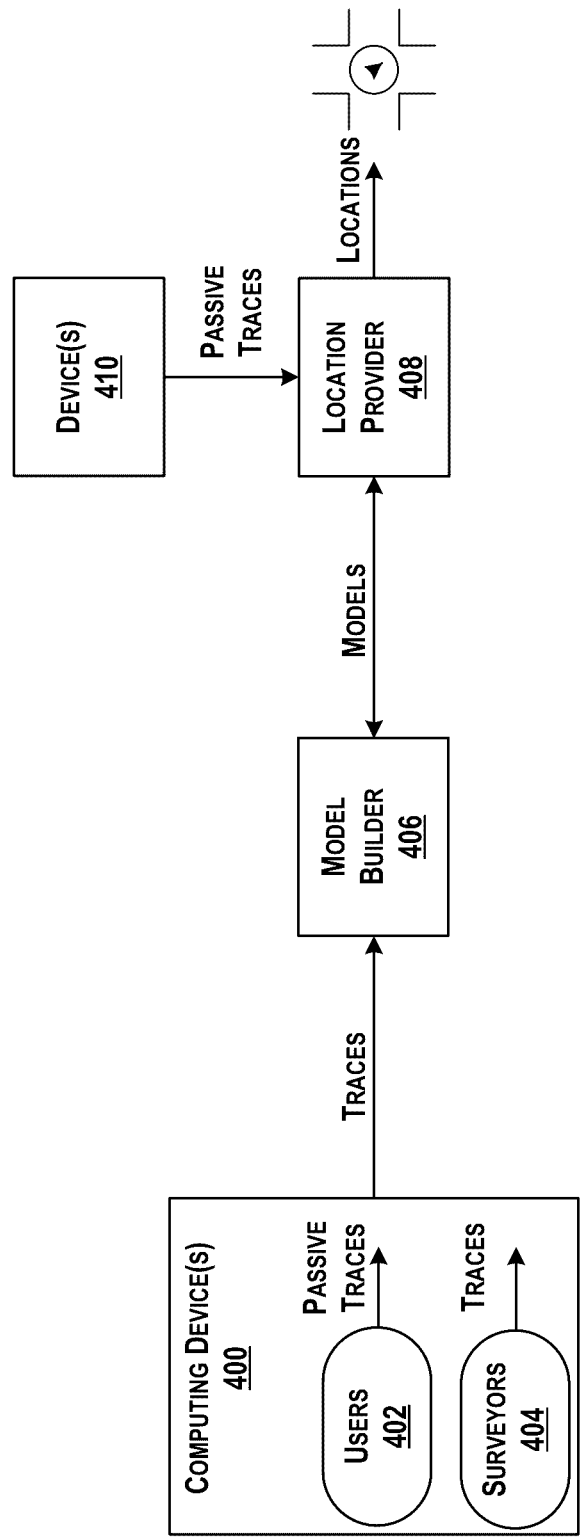
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (i.e., the device may be configured to output the trace data with no additional user input), including raw data output by sensors of the device like WiFi scans, GPS data, accelerometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces.

Traces received from devices may include a variety of measurements from multiple different sensors, and may include a variety of measurements collected over time or at various locations. A trace may refer to a sensor log or a collection of data output from sensors on the device over some time period and collected over a number of locations. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long or any ranges therein or longer). Measurements in a trace or from trace to trace may be considered statistically independent. However, in instances in which the measurements are collected from positions/locations in close proximity or collected close in time, the measurements may have correlations.

The traces or logs of data may be used to build a WiFi signal strength map of the number of locations aligned to latitude and longitude or position coordinates. Estimate WiFi access point (AP) positions can be made based on known locations of where the WiFi scans occurred. The reverse is also true. To solve the problem when both are initially unknown, a simultaneous localization and mapping (SLAM) can be performed to solve both at the same time using received data in the traces. If one of a location of a WiFi AP or locations of WiFi scans are known, then the known data can be held constant while optimizing the other. The received traces can be used to determine relative paths traversed by the devices using dead reckoning, which provides estimates of AP locations and trajectory of the devices relative to each other, and such relative estimates can be aligned with more absolute positions using measurements from GPS. However, GPS provides latitude and longitude measurements, but only in certain locations (mostly outdoors).

Thus, within examples, trustworthy measurements in an absolute frame can be accessed first to generate a first estimate of a WiFi signal strength map, and new measurements and new sensor logs can be introduced to refine the estimate using the estimate as a starting point to build upon. As each new piece of data is introduced, a current estimate is held constant and used to determine an initial estimate for the new data. Then, a SLAM optimization may be performed to jointly optimize all data without keeping anything constant. Iterations may be performed until all data has been considered. Thus, within examples, processes can be performed iteratively, starting with a convex problem and adding more and more non-convex constraints.

Figure 5:
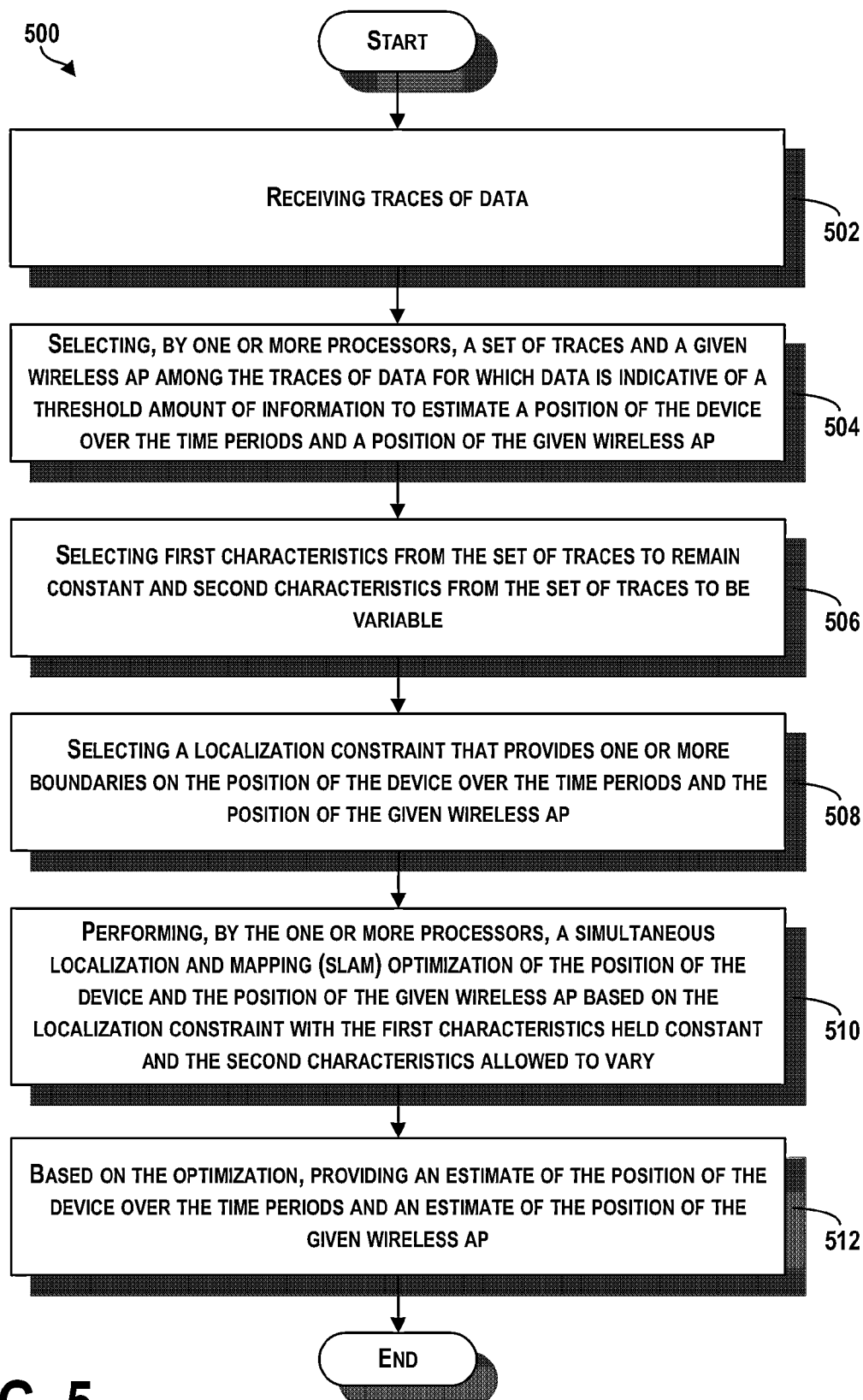
FIG. 5 is a block diagram of an example method of determining an estimate of a position of a device and a position of a wireless AP, in accordance with at least some embodiments described herein.

FIG. 5 is a block diagram of an example method of determining an estimate of a position of a device and a position of a wireless AP, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the system in FIG. 4, for example, or may be performed by a combination of any components of in FIGS. 1-4. Method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Functions of the method 500 may be fully performed by a computing device (or components of a computing device such as one or more processors), or may be distributed across multiple computing devices and/or a server. In some examples, the computing device may receive information from sensors of the computing device, or where the computing device is a server the information can be received from another device that collects the information.

At block 502, the method 500 includes receiving traces of data. Respective data is collected by sensors of a device over a plurality of locations and over time periods, and a respective trace of data includes received signal strength indication (RSSI) data for a plurality of wireless access points (AP). A respective trace of data may include one or more of GPS positioning data, received signal strength indication (RSSI)

for a wireless access point (AP), accelerometer data, gyroscope data, barometer data, magnetometer data, image data, and any other data collected by a sensor of the device. The traces of data may be received on a continual basis, or periodically as the data is collected, such as every 5 seconds, a new trace of data having data collected over the 5 second time period may be received. An example trace of data may be associated with a time stamp and may include GPS coordinates, WiFi scans, and accelerometer data. However, traces of data may include different combinations of data, or data collected at different times (e.g., at time t=2 s, GPS output lat=23.56789, lng=67.23456; at time t=2.1 s, four Wifi APs observed at recorded RSSI strengths; at time t=2.4 s, a step was recorded and turned right by 10 degrees, etc.).

The traces of data may be received by a server from the device, or may be considered received by one or more processors from the sensors of the device.

At block 504, the method 500 includes selecting, by one or more processors, a set of traces and a given wireless AP among the traces of data for which data is indicative of a threshold amount of information to estimate a position of the device over the time periods and a position of the given wireless AP. Using the method 500, estimates of a position of the device and estimates of a position of wireless APs may be determined together or simultaneously, and it is desired to allow good traces to influence locations of the wireless APs and good WiFi data to influence locations of the device.

Within examples, what is considered good data varies, and the threshold amount of information may be evaluated using a number of factors. Example factors for selecting a given wireless AP for which data indicates a threshold amount of information to estimate one or more of the position of the device over the time periods and the position of the given wireless AP includes a given time period of accessibility of the given wireless AP exceeding a threshold (e.g., if the WiFi AP is seen a number of times in a number of traces, or a number of times over a period of days, then data of the WiFi AP is likely to be accurate), and an amount of matching of the WiFi data to a diffuse signal strength map (e.g., if a WiFi AP has more than maximum in a signal strength map, such RSSI data for the WiFi AP may not be accurate since a WiFi AP will generally have one maximum area at a location of the WiFi AP).

Example factors for selecting a given trace for which data indicates a threshold amount of information to estimate one or more of the position of the device over the time periods and the position of the given wireless AP include any of the factors in the following table, and any combination of any of such factors.

1. A number of GPS readings in the traces
2. A number of magnetometer data in the traces
3. A number of barometer data in the traces or changes in barometer readings (indicating changes in floors or a floor of a building on which the device traverses).
4. Whether GPS data in the traces and relative position estimates of the device based on dead reckoning are matching
5. Accelerometer or gyroscope data in the traces indicating an average rotation of the device per step being less than a step threshold (e.g., gyroscope data that indicates walking in circles is likely not accurate)

-continued

6. An amount of time between relative position estimates of the device per step (e.g., a time between steps, if constant, may be indicative of accurate step detection and a useful trace). If time between steps is long, such as a few steps recorded within 2 minutes, then may be likely that steps are missing or bad dead reckoning estimations).
7. An amount of "deadspots" in a trace (e.g., if consistent GPS data is provided throughout a trace, that may be deemed a high quality trace. But, a trace having sporadic or missing GPS data may be less accurate).
8. A number of WiFi measurements that have seen a given WiFi router (e.g., how many WiFi readings have seen APs in the traces).
9. Whether an orientation of the device relative to a user has changed (e.g., a user holding a mobile user make change orientation of the device, and such changes may affect dead reckoning measurements in a negative manner).
10. A confidence value associated with estimates of a location of APs and traces (e.g., a current best estimate of a position of a WiFi AP can be computed and may have an uncertainty associated with the estimate).
11. A number of measurements in which a WiFi AP is seen, or a number of days (or any time period) over which the WiFi AP is seen (more measurements or more frequency of obverting the WiFi AP may provide a higher confidence in existence of and position of the WiFi AP).
12. Comparison to a location database for WiFi APs, and if a location of an AP "moves", such data may be considered inaccurate (e.g., a WiFi AP may be registered into a database that logs a location of the AP, and generally, APs locations are static).
13. A length of a trace (e.g., a longer trace, in terms of time over which data is collected may be considered more accurate)
14. An estimated gyro bias (if high, there is likely a problem with the data, and such traces may be rejected)
15. An average step length (e.g., if an average step length is computed at say 5 m, such data may be inaccurate. An average step length of about 40 cm or less may be considered accurate).
16. Whether measurements from a WiFi AP have a range of signal strengths (e.g., some strong and some weak signals are representative of expected values).
17. Whether a segment of a trace selected in a previous iteration provided accurate data, it is more likely that subsequent segments include accurate data as well.

Thus, any of the factors in the table above may be used to select traces for processing. Filtering traces according to the factors above enables use of data that is likely to be more accurate. As described below, the method 500 may be performed over a number of iterations, and initial iterations can be performed using data considered more accurate, followed by subsequent iterations in which other uncertain data is used.

At this stage, the method 500 may optionally include estimating a position of the selected traces using a global optimization algorithm, such as the Viterbi algorithm. This my provide an initialization or initial estimate of the position as a basis for processing.

At block 506, the method 500 includes selecting first characteristics from the set of traces to remain constant and second characteristics from the set of traces to be variable. An optimization process is performed, and characteristics set to remain constant are unchanged during the process. As examples, characteristics that may be selected to remain constant include relative position estimates of the device based on dead reckoning, and positions of the plurality of wireless access points (AP) as seen in the traces to remain constant. Examples of characteristics set to be variable include any other characteristics of the traces and WiFi APs, such as allowing the traces to vary, allowing a position of the APs to vary, etc. Thus, any of the characteristics not held constant may be allowed to vary.

At block 508, the method 500 includes selecting a localization constraint that provides one or more boundaries on the position of the device over the time periods and the position of the given wireless AP. A localization constant may include GPS data that provides a boundary on the positions of the device and APs, GPS data and relative position estimates of the device based on dead reckoning as the localization constraint, or a type of WiFi signal strength model as a constraint. The boundary may provide a maximum amount of location change allowed to the position of the device and APs during the optimization process.

At block 510, the method 500 includes performing, by the one or more processors, a simultaneous localization and mapping (SLAM) optimization of the position of the device and the position of the given wireless AP based on the localization constraint with the first characteristics held constant and the second characteristics allowed to vary. Within an example, performing the SLAM optimization includes performing a non-linear least squares optimization of possible locations of the device and of the given wireless AP by reducing a square error between the possible locations of the device and of the given wireless AP due to observed GPS positioning data and RSSI. The SLAM optimization may include a non-linear least squares optimization, such as open source software like Ceres.

In some example, performing the SLAM optimization includes performing the SLAM optimization over a plurality of iterations on growing subsets of localization constraints for determination of an optimal estimate of the position of the device over the time periods and the position of the given wireless AP based on the received traces of data from the devices.

As one example, the iterations include selecting the set of traces to process based on the traces data having an amount of GPS positioning data being less than a given amount of GPS positioning data in a previously selected set of traces, and performing the SLAM optimization based on the selected set of traces. For a first iteration, a first set of traces can be selected based on an amount of GPS positioning data in the traces exceeding a count threshold, for example.

At block 512, the method 500 includes based on the optimization, providing an estimate of the position of the device over the time periods and an estimate of the position of the given wireless AP. The estimate may be provided based on outputs of the iterative optimizations.

Additional data may also be output. Within examples, for a selected set of traces, a path of the device based on relative position estimates of the device due to dead reckoning may be aligned to GPS positioning data of the set of traces so as to provide a relative path of the device, and following given RSSI for the given wireless AP may be aligned to the relative path of the device based on data collection times so as to provide initial signal strength maps for the given wireless AP. Optimizations of possible locations of the given wireless AP may be performed based on the initial signal strength map for the given wireless AP with the relative path of the device held constant, and based on the optimizations, a first signal strength map for the given wireless AP aligned to position coordinates can be provided.

Figure 6:
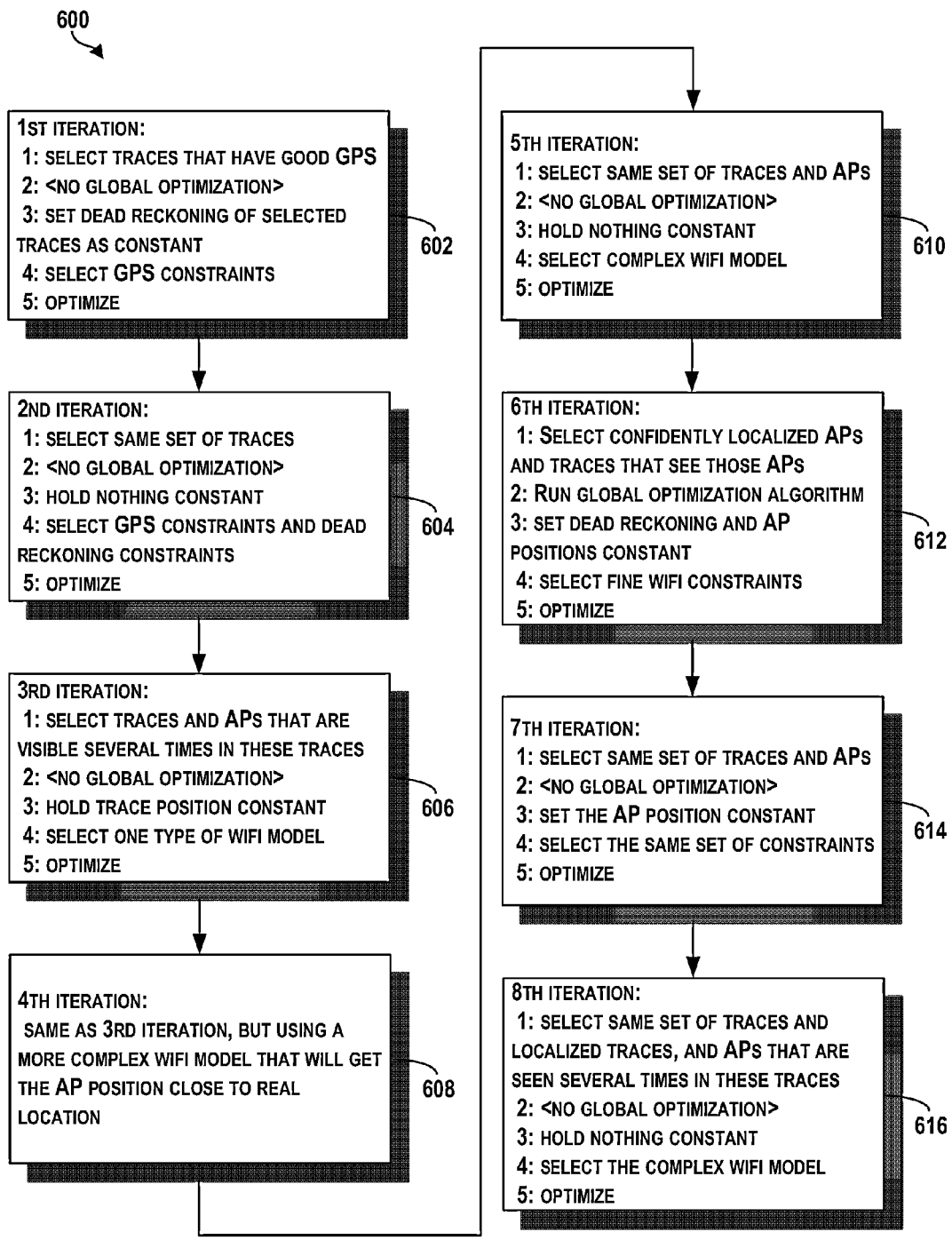
FIG. 6 is a flow diagram illustrating an example strategy for determining positions of devices and positions of WiFi APs.

FIG. 6 is a flow diagram illustrating an example strategy 600 for determining positions of devices and positions of WiFi APs. In a first iteration, as shown at block 602, the traces that have good GPS are selected because no additional information may be needed to estimate a position of those traces (e.g., GPS is considered absolute) and no AP is initially selected. Following, no global optimization is performed, and dead reckoning of the selected traces is set as constant (e.g., an attempt is made to align the selected traces without changing their shapes), GPS constraints are selected, and the SLAM optimization is performed.

In a second iteration, as shown at block 604, the same set of traces output from the first iteration are selected, and no global optimization is performed. Next, nothing is held constant so that a shape of the traces may change, and the localization constraints include both GPS and dead reckoning, and the SLAM optimization is performed.

In a third iteration, as shown at block 606, the same set of traces output from the second iteration are selected, and also APs are selected that are visible several times in this set of traces. Again, no global optimization is performed. Trace positions are held constant so that the positions will not move, and a type of WiFi model that is inaccurate but convex is selected as a localization constraint. The SLAM optimization is performed, and the positions of the AP will be initialized and brought within about 30 meters of a real or expected location.

In a fourth iteration, as shown at block 608, same parameters as used during the third iteration are input, but using a more complex WiFi model to get the AP position closes to a real location.

In a fifth iteration, as shown at block 610, traces output from the fourth iteration are selected, and again no global optimization is performed. Next, nothing is held constant so that the SLAM may be performed to simultaneously estimate a position of the traces, and a position of the APs. A complex WiFi model and GPS constraints, dead reckoning constraints, and other priors known about AP position from other sources (e.g., AP location databases) are selected, and the SLAM optimization is performed.

After the fifth iteration, a good estimate of the localization of the traces is in place, and of the APs that were most often seen in those traces, but the selected traces likely do not represent positions of devices in areas where GPS data is unknown (e.g., inside a building). Next, it is desired to utilize more traces of data, even if such traces have bad or no GPS data, by localizing such traces based on WiFi information obtained by localizing the WiFi APs and localizing the previous traces.

In a sixth iteration, as shown at block 612, most confidently localized APs are selected, and traces that see those APs along most of their path are selected. Any already-localized traces may be deselected. A global optimization algorithm (Viterbi) may be performed for those traces using WiFi AP positions and WiFi maps computed with the already localized traces. The dead reckoning and the AP positions may be set as constant, and fine WiFi constraints, GPS constraints, and Viterbi result constraints (similar to GPS constraints, but this time, position estimates come from an output of the global localization algorithm) are selected, and the SLAM optimization is performed. Thus, in this example iteration, traces having no GPS positioning data in the traces can be selected, and a global optimization can be performed for positions of the device given associated RSSI data in these traces and also based on one or more relative position estimates of the device due to dead reckoning.

In a seventh iteration, as shown at block 614, a set of traces output from the sixth iteration are selected, and now no global optimization is performed. AP position is set to be constant, and the same set of constraints from the sixth iteration are used (e.g., still using the Viterbi constraints created from the global optimization step), and the SLAM optimization is performed.

In an eighth iteration, as shown at block 616, the same set of traces as well as already localized traces are selected, and APs that have been seen several times in this set of traces, and no global optimization is performed. Nothing is held constant (e.g., full SLAM), and the complex WiFi model, GPS constraints, dead reckoning constraints, and other priors known about AP position from other sources, are selected. The SLAM optimization is then performed.

The sixth, seventh, and eighth iterations can be repeated until all the traces have been selected, or no new traces are selected because remaining traces only see APs that were never well localized.

Outputs of the eighth iteration include path location estimates for the traces as well as locations of the APs, and the localized traces have confidence values on this localization. Additionally, localization of the APs seen in those traces have confidence values. In addition, additional maps of characteristics of data collected by the device may be output, such as a map of a magnetic field in the areas visited by the traces (e.g., localization of any data collected by the devices can be performed).

Figure 7:
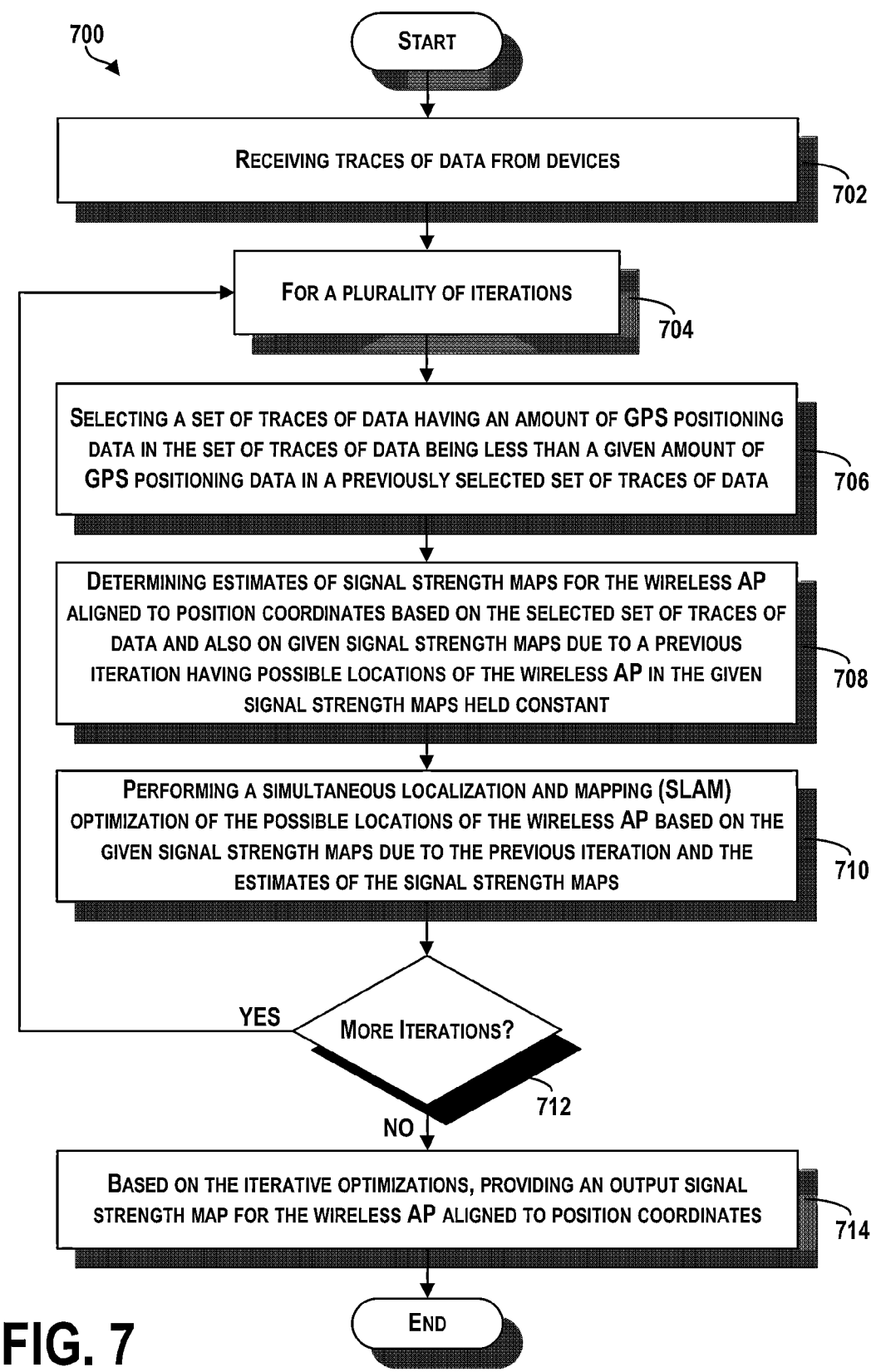
FIG. 7 is a block diagram of an example method of iteratively determining a signal strength map for a wireless access point (AP) aligned to position coordinates, in accordance with at least some embodiments described herein.

FIG. 7 is a block diagram of an example method of iteratively determining a signal strength map for a wireless access point (AP) aligned to position coordinates, in accordance with at least some embodiments described herein. Method 700 shown in FIG. 7 presents an embodiment of a method that, for example, could be used with the system 100 in FIG. 1, the device 200 in FIG. 2, the server 300 in FIG. 3, or the system in FIG. 4, for example, or may be performed by a combination of any components of in FIGS. 1-4. Method 700 may include one or more operations, functions, or actions as illustrated by one or more of blocks 702-714. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 700 and other processes and methods disclosed herein, each block in FIG. 7 may represent circuitry that is wired to perform the specific logical functions in the process.

Functions of the method 700 may be fully performed by a computing device (or components of a computing device such as one or more processors), or may be distributed across multiple computing devices and/or a server. In some examples, the computing device may receive information from sensors of the computing device, or where the computing device is a server the information can be received from another device that collects the information.

At block 702, the method 700 includes receiving traces of data from devices. The traces of data may include data collected by sensors of the devices over a plurality of locations and over time periods, a respective log of data includes one or more of GPS positioning data, received signal strength indication (RSSI) for a wireless access point (AP), accelerometer data, and gyroscope data. As described previously, the traces of data may be received continually, or at predetermined time periods.

The method 700 may include a number of functions performed for a plurality of iterations, as shown at block 704. One function, as shown at block 706, includes selecting a set of traces of data having an amount of GPS positioning data in the set of traces of data being less than a given amount of GPS positioning data in a previously selected set of traces of data. As an example, for a first iteration, a set of traces of data may be selected based on an amount of GPS positioning data in the logs of data exceeding a count threshold. The count threshold may require all traces of data to have corresponding GPS. A trace of data may have outputs of sensors with timestamps for which the data was collected by the sensors, and a count threshold may require that all data outputs have corresponding GPS data for each timestamp. The count threshold may also be set to lower counts, such as requiring that at least 95% of data have a corresponding GPS data, or 90%, and so on. Within examples, for the first iteration, the count threshold may be set the highest, and some range between about 75%-100% of data may be required to have corresponding GPS data to filter out high trustworthy data for use in the first iteration. Then, for subsequent iterations, a subsequent set of traces of data can be selected that has an amount of GPS positioning data in the subsequent set of traces of data less than the amount of GPS positioning data in a previously selected set of logs of data. For instance, in each subsequent iteration, the count threshold for GPS data may be lowered, such that less reliable data is selected for use in subsequent iterations. And, ultimately, for a last iteration, a given set of traces of data may be selected that has no GPS positioning data in the set of traces of data.

The set of traces of data may be selected based on other factors as well to further filter the data for processing. As an example, traces of data are collected by sensors of the devices over respective time periods, and the set of traces of data may be selected based also on a duration of a respective time period exceeding a time threshold. The time threshold may be 5 seconds or up to 5 minutes, depending on whether the processing is occurring in real-time or in batch mode. As another example, the set of traces of data may further be selected based also on the accelerometer or gyroscope data in the traces of data indicating an average rotation of the respective device per step being less than a step threshold. The step threshold may be correlated to be about 5-10 degrees so that data is selected for use in which the device is likely moving forward and has low bias associated with sensor outputs.

At block 708, the method 700 includes determining estimates of signal strength maps for the wireless AP aligned to position coordinates based on the selected set of traces of data and also on given signal strength maps due to a previous iteration having possible locations of the wireless AP in the given signal strength maps held constant. For example, for a first iteration, a signal strength map is determined, and used within later iterations as a starting point with the locations of the wireless AP held constant to incorporate changes due to new data.

Specifically, in one example, for a first set of traces of data, initially a path based on a dead reckoning determination from the accelerometer data or gyroscope data of the first set of traces of data can be aligned to the GPS positioning data of the first set of traces of data so as to provide relative paths of the devices based on the first set of traces of data.

Dead reckoning calculations link relative position of devices between two steps. A first step may be at time t, and another t+1 that is likely to be around 3 ft in front of the first, and angle of turn can be determine using gyroscope data. An example dead reckoning determination may be performed by to determine an estimation of a current position of the computing device based on a previous position of the computing device, an estimated speed over an elapsed time, and a direction of travel of the computing device. Within examples, information indicating a previous position may be received from a server that calculates or determines the information due to communication with the computing device, or from sensors of the computing device including a GPS sensor. The previous position may also be derived or calculated from a number of data points such as GPS location determinations, or WiFi scans and associated WiFi mappings. The estimated speed can also be received from a server, or derived or calculated from position determinations over the elapsed time or based on other data over the elapsed time including outputs of a pedometer, for example. Using a known or estimated distance traveled (as derived or calculated from outputs of a pedometer, outputs of an accelerometer inferring a step has been taken, or other sensor data), a speed can be determined based on the elapsed time. The direction of travel of the computing device may similarly be determined from data received from a server, or from sensors on-board the computing device such as a magnetometer or compass, for example. Any available information may be used to infer a direction of travel including a fusion of accelerometer, gyroscope, and optionally magnetometer data, for example. In still other examples, other available information can be used to provide further estimates (directly or indirectly) as to direction of travel, including WiFi scans received in traces that may give information as to a position and heading of a device and/or user.

The dead reckoning calculation can then be performed to determine an estimation of the current position of the computing device. As an example, an accelerometer of the computing device can be used as a pedometer and a magnetometer as a compass heading provider. Each step of a user of the computing device causes a position to move forward a fixed distance in a direction measured by the compass. Accuracy may be limited by precision of the sensors, magnetic disturbances inside structures of the computing device, and unknown variables such as carrying position of the computing device and stride length of the user. However, the estimate of the current position can be determined in this manner.

The path based on the dead reckoning determination can be aligned to the GPS positioning data of the first set of logs of data so as to provide relative paths of the devices mapped to position coordinates.

Figure 8A:
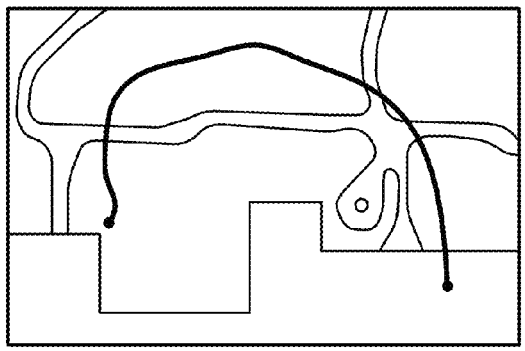
FIGS. 8A-8B illustrate example conceptual paths due to fusing GPS with dead reckoning data received from a device.
Figure 8B:
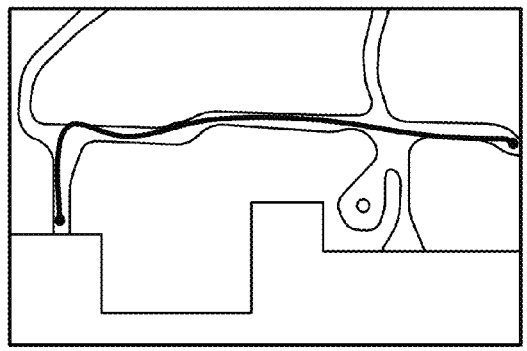

FIGS. 8A-8B illustrate example conceptual paths due to fusing GPS with dead reckoning data received from a device. In this example, in FIG. 8A, the path calculated based on a dead reckoning determination shows the device moving through an area and the dead reckoning calculation would indicate that the device went off the trail. In FIG. 8B, the path determined based on GPS data may be more precise and indicates a more likely trajectory of the device. The paths in FIGS. 8A and 8B generally agree, and each can be aligned together resulting in an estimated trajectory that would indicate the device/user staying on the trail, for example.

Returning to the method 700, following alignment of the dead reckoning and GPS paths, given RSSI for the wireless AP can be aligned to a given relative path of a given device, for a given log of data in the first set, based on data collection times so as to provide initial signal strength maps for the wireless AP. Thus, once the relative path from dead reckoning calculation and GPS coordinates has been determined, WiFi scans collected along the path can be matched to the relative path based on matching collection times (e.g., timestamps) of the sensor data.

Figure 8C:
FIG. 8C illustrates an example conceptual initial signal strength map for the wireless AP.

FIG. 8C illustrates an example conceptual initial signal strength map for the wireless AP. A signal strength may be indicated by shading, and a darker shading indicates a stronger signal strength. Various paths determined from aligned dead reckoning and GPS data of devices are shown as well with the resulting WiFi signal strengths input due to correspondences to the path.

Returning to the method 700, a non-linear optimization of possible locations of the wireless AP can then be performed based on the initial signal strength maps for the wireless AP with the relative paths of the devices held constant. An example non-linear optimization may include Ceres, which is an open source public project. Any non-linear optimization algorithm is possible though. Within examples, the non-linear optimization adjusts an estimate of state parameters (AP positions or device positions) to better match observations of data (GPS, WiFi scans, gyroscope measured orientation change, accelerometer measured steps). The optimization reduces a "square error" by modifying the state estimate a little at a time until the estimate results in a square error that can no longer be reduced. The non-linear optimization uses the initial signal strength map with the relative paths of the devices held constant, since such paths were derived from trustworthy data, e.g., GPS data, and are assumed to be correct. Thus, the non-linear optimization can be performed to determine possible locations of the wireless AP using the possible locations of the wireless AP in the given signal strength maps due to the previous iteration as constants, and reducing a square error between the possible locations of the wireless AP and locations of the wireless AP due to observed GPS positioning data and RSSI.

Estimates of signal strength maps, using the initial map with constraints and incorporating modifications due to observed data, for the wireless AP based on the logs of data from the many devices are output from the non-linear optimizations.

At block 710, the method 700 includes performing a simultaneous localization and mapping (SLAM) optimization of the possible locations of the wireless AP based on the given signal strength maps due to the previous iteration and the estimates of the signal strength maps. Within examples, the SLAM optimization comprises performing a GraphSLAM optimization, however, other SLAM algorithms may also be used. SLAM algorithms are state estimation algorithms in which a state (localization of traces and characteristics of maps) is determined by maximizing its likelihood. The likelihood comes from a set of constraints, which are indicated by data within the logs of data. Because the state can lie in a space of high dimension (e.g., hundreds of thousands of dimensions), finding a global optimum may be difficult. GraphSLAM uses a nonlinear least squares solver designed to find local optimum. It may find the global optimum if a state initialization was close enough to it. Thus, the signal strength maps of previous iterations are used as a starting point to help the SLAM optimization achieve a result more quickly.

At block 712, the method 700 includes determining whether more iterations are available. The method 700 may be repeated in any number of iterations based on how much data is included in the set of logs, or based on how granular of thresholds are used to filter the data per iteration. Thus, for a first iteration, perhaps logs of data that have at least 90% corresponding GPS data are chosen, and subsequent iterations are performed by lowering the threshold 10% each time to run ten iterations. Other divisions are possible as well.

At block 714, the method 700 includes based on the iterative optimizations, providing an output signal strength map for the wireless AP aligned to position coordinates. Once all iterations have been performed, all data that has been received has been considered and contributed to the development of the signal strength map for the wireless AP. The method 700 may perform the SLAM optimization on growing subsets of constraints, as more iterations are performed and more data considered, for determination of an optimal location of the wireless AP based on the received logs of data from the devices.

One example of execution of the method 700 includes running a few iterations on received logs of data. For a first iteration, a first set of logs of data are selected based on an amount of GPS positioning data in the logs of data exceeding a count threshold. For the first set of logs of data, a path based on a dead reckoning determination from the accelerometer data or gyroscope data of the first set logs of data is aligned to the GPS positioning data of the first set of logs of data so as to provide relative paths of the devices based on the first set of logs of data. Given RSSI for the wireless AP is aligned to a given relative path of a given device, for a given log of data in the first set, based on data collection times so as to provide initial signal strength maps for the wireless AP. The path may be further aligned based also on one or more transition probabilities based on a floorplan of a building, for example. Next, a first non-linear optimization of possible locations of the wireless AP may be performed based on the initial signal strength maps for the wireless AP with the relative paths of the devices held constant. A first SLAM optimization of the possible locations of the wireless AP may then be performed based on the initial signal strength maps for the wireless AP, and based on the first SLAM optimization, first signal strength maps are provided for the wireless AP aligned to position coordinates.

Following, for a second iteration, a second set of logs of data are selected based on an amount of GPS positioning data in the logs of data being within a range between the first count threshold and a second count threshold that is less than the first count threshold. For the second set of logs of data, again a path based on a dead reckoning determination from the accelerometer data or gyroscope data of the second set logs of data is aligned to the GPS positioning data and RSSI data of the second set of logs of data so as to provide relative paths of the devices and corresponding RSSI based on the second set of logs of data. The first signal strength maps for the wireless AP can be updated based on the relative paths of the devices and corresponding RSSI from the second set of logs of data with the possible locations of the wireless AP in the first signal strength maps held constant. A second SLAM optimization can be performed of the possible locations of the wireless AP based on the first signal strength maps and possible locations of the wireless AP based on the relative paths of the devices and corresponding RSSI due to the second set of logs of data. Based on the second SLAM optimization, second signal strength maps can be provided for the wireless AP aligned to position coordinates.

More iterations may be performed, and after a final iteration, the signal strength maps are resolved to a single signal strength maps for the wireless AP.

Further filters may be included for use in the method 700 when selecting which of the received data to use for contributing to the signal strength map. For example, RSSI data for the wireless AP can be selected based on a given time period of accessibility of the wireless AP exceeding a threshold. Thus, for newly installed AP's, or AP's that are not constantly on or providing coverage, such scan data may be inconsistent and unreliable, and thus, filtered out. Or, in other examples, the scan data may be considered more reliable when the AP has been in use for longer periods of time.

The method 700 may be used to develop a WiFi signal strength map based on observed RSSI by a device mapped to a most probable path taken by the device and indicated by outputs of sensor observations. If GPS was available at all time and accurate, GPS may be used to develop the map. However, all sensors may have some imprecision due to noise, and GPS may not always be available. Thus, observations from all sensors are used.

Generally, within examples herein and as illustrated by the method 700, first, a first tier of sensor logs that had a GPS lock the whole time are selected for processing and aligned with a relative path that comes from dead reckoning calculations. After aligning, there is a good guess where the device was when each WiFi scan in that sensor log occurred, and thus, the WiFi scans are used to build an initial WiFi signal strength map with estimated AP positions. In this example, trajectories of the device are considered known and kept constant while AP positions are optimized using a non-linear optimization. After that, the AP positions have a good starting point, and so a SLAM optimization can be performed on all selected data in which neither the AP position nor the trajectory is held constant.

A second iteration is then performed with second tier sensor logs, in which some have trustworthy GPS but also have some periods without GPS. The initial WiFi map is used to estimate absolute location of the device in these second tier logs using the WiFi scans even though there are periods without GPS. A similar process is performed to calculate a dead reckoning path for the second tier logs, and then find the optimal trajectory for each one using the GPS and WiFi scans. WiFi AP positions are held constant in the initial map since the trajectories based on the second tier logs may initially be unknown. Once the second tier trajectories have a decent estimate (using the WiFi scans, GPS, dead reckoning and fixed AP positions), a SLAM optimization can be performed where the WiFi map is no longer held constant and everything can be jointly optimized (including the first tier and the AP positions).

Additional iterations are performed using third tier, fourth tier, etc. sensor logs. These logs may not have good GPS or may have no GPS. Again, the relative dead reckoning can be aligned to the absolute frame though using the WiFi scans and the WiFi AP map built using the first and second tiers. Again, the WiFi AP positions are kept constant and a good initial estimate for the trajectories is determined. Then, a SLAM optimization can be performed again where everything is optimized jointly. Within examples, such methods allow use of all data received, even from third or later tiers where they have no "absolute" observations (i.e., no GPS).

An additional consideration is that within the optimization, initially a local optimization is performed to modify the starting estimate. A global optimization then searches all possible states for a best one rather than having to tweak initial guesses. Global optimizations are performed as a last function after initial guesses for trajectory of the third or last tier of data are found, and then, the global optimization finds a most probable location of the WiFi. It may be more likely to find a best solution iteratively rather than analyzing all data which could lead to identification of local minimums only.

Figure 9:
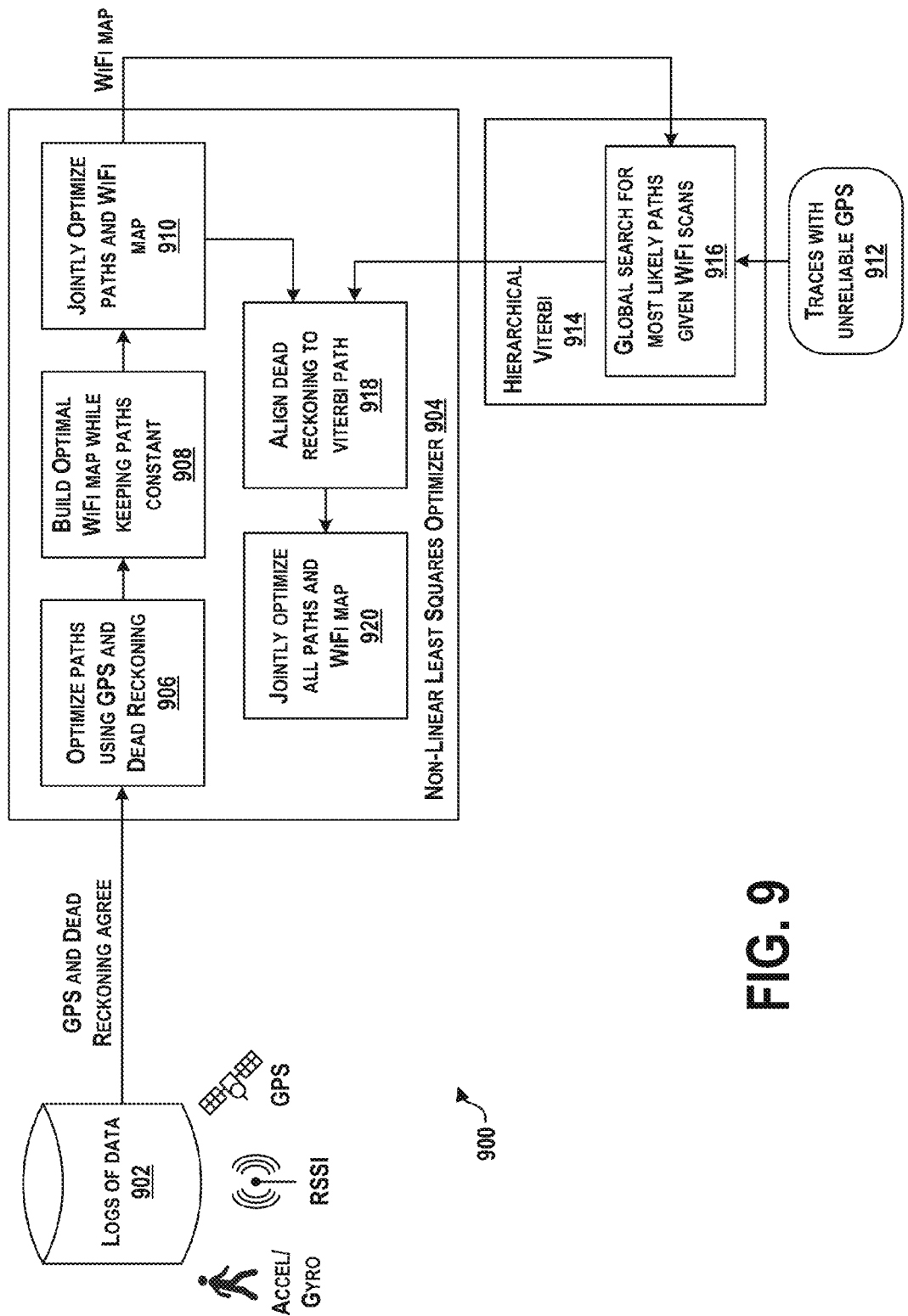
FIG. 9 is a block diagram that conceptually illustrates an example system for determining a WiFi map.

FIG. 9 is a block diagram that conceptually illustrates an example system 900 for determining a WiFi map. Any of the blocks in the system 900 may be modules, processors, or other devices, or may take the form of instructions executable by processors to perform the associated function. In the system 900, logs of data 902 are received from devices. The logs of data include GPS, RSSI, accelerometer, and gyroscope data with associated timestamps as collected by respective devices. The logs of data for which a dead reckoning and GPS location agree may be provided to a non-linear least squares optimizer 904, for example. Logs of data for which a dead reckoning and GPS location do not agree may be rejected as erroneous data or data with too much noise. The non-linear least squares optimizer 904 may optimize paths using GPS and dead reckoning, as shown at block 906 and as described above using for example a ceres optimizer, and then build optimal WiFi maps while keeping the paths constant, as shown at block 908. The non-linear least squares optimizer 904 may further jointly optimize paths and WiFi maps using a SLAM optimization and output a WiFi map, as shown at block 910.

Traces with unreliable GPS data (at block 912) may be received at a hierarchical Viterbi processor 914 to perform a global search for most likely paths given associated WiFi scans in the traces, as shown at block 916. As an example, a path of a user trace may be determined using the Viterbi algorithm (e.g., most likely path through a graph) based on one or more of motion probabilities from dead reckoning, transition probabilities from floorplan, or emission probabilities from a WiFi model. The non-linear least squares optimizer 904 may receive the output of the global search and align with the dead reckoning to a Viterbi path, as shown at block 918, and jointly optimize all paths and WiFi maps using a SLAM optimization, as shown at block 920.

The SLAM optimization is performed iteratively on growing subsets of states and constraints to determine a location of a user when data was collected based on all data collected. A first iteration uses subsets so that a function minimized is convex. Running SLAM on these subsets gives an estimate of the state subset. This estimate is used for determining the next subsets to include and the initialization to use for the next iteration. Thus, more constraints are added using a previous determination as a time starting point as the best prediction. The system 900 defines a process that selects states, optimizes the states using a non-linear least squares solver, and runs SLAM algorithms to determine how to initialize the state for the next optimization iteration.

Although examples are described as determining a WiFi signal strength map, similar or same functions may be performed to determine localization of passively collected traces for creation of other types of maps, such as magnetometer maps, Bluetooth maps, cellular tower signal strength maps, etc.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving traces of data, wherein respective data is collected by sensors of a device over a plurality of locations and over time periods, and wherein a respective trace of data includes received signal strength indication (RSSI) data for a plurality of wireless access points (AP);
   selecting, by one or more processors, a set of traces and a given wireless AP among the traces of data for which data is indicative of a threshold amount of information to estimate a position of the device over the time periods and a position of the given wireless AP;
   selecting first characteristics from the set of traces to remain constant and second characteristics from the set of traces to be variable;
   selecting a localization constraint that provides one or more boundaries on the position of the device over the time periods and the position of the given wireless AP;
   performing, by the one or more processors, a simultaneous localization and mapping (SLAM) optimization of the position of the device and the position of the given wireless AP, over a plurality of iterations, based on the localization constraint with the first characteristics held constant and the second characteristics allowed to vary;
   for the plurality of iterations, (i) selecting the set of traces based on the traces of data having an amount of GPS positioning data being less than a given amount of GPS positioning data in a previously selected set of traces, and (ii) performing the SLAM optimization based on the selected set of traces; and based on the iterative optimizations, providing an estimate of the position of the device over the time periods and an estimate of the position of the given wireless AP.

2. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on a floor of a building on which the device traverses as indicated by data in the traces.

3. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the given wireless AP based on a given time period of accessibility of the given wireless AP exceeding a threshold.

4. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on accelerometer or gyroscope data in the traces indicating an average rotation of the device per step being less than a step threshold.

5. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on whether GPS data in the traces and relative position estimates of the device based on dead reckoning are matching.

6. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on a number of GPS readings in the traces.

7. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on a number of magnetometer data in the traces.

8. The method of claim 1, wherein selecting, by one or more processors, the set of traces and the given wireless AP among the traces of data for which data is indicative of the threshold amount of information to estimate the position of the device over the time periods and the position of the given wireless AP comprises:

selecting the set of traces based on an amount of time between relative position estimates of the device per step.

9. The method of claim 1, wherein selecting the first characteristics from the set of traces to remain constant comprises selecting relative position estimates of the device based on dead reckoning to remain constant.

10. The method of claim 1, wherein selecting the first characteristics from the set of traces to remain constant comprises selecting positions of the plurality of wireless access points (AP) as seen in the traces to remain constant.

11. The method of claim 1, wherein selecting the localization constraint that provides one or more boundaries on the position of the device over the time periods and the position of the given wireless AP comprises selecting GPS data in the traces as the localization constraint.

12. The method of claim 1, wherein selecting the localization constraint that provides one or more boundaries on the position of the device over the time periods and the position of the given wireless AP comprises selecting GPS data and relative position estimates of the device based on dead reckoning as the localization constraint.

13. The method of claim 1, wherein performing the SLAM optimization of the position of the device and the position of the given wireless AP comprises:

performing a non-linear least squares optimization of possible locations of the device and of the given wireless AP by reducing a square error between the possible locations of the device and of the given wireless AP due to observed GPS positioning data and RSSI.

14. The method of claim 1, wherein performing the SLAM optimization comprises performing the SLAM optimization over the plurality of iterations on growing subsets of localization constraints for determination of an optimal estimate of the position of the device over the time periods and an optimal estimate of the position of the given wireless AP based on the received traces of data from the devices.

15. The method of claim 14, further comprising:

for a first iteration, selecting a first set of traces based on an amount of GPS positioning data in the traces exceeding a count threshold; and for the first set of traces, aligning a path of the device based on relative position estimates of the device due to dead reckoning to GPS positioning data of the first set of trace so as to provide a relative path of the device;

aligning given RSSI for the given wireless AP to the relative path of the device, for a given trace in the first set, based on data collection times so as to provide initial signal strength maps for the given wireless AP;

performing a first optimization of possible locations of the given wireless AP based on the initial signal strength map for the given wireless AP with the relative path of the device held constant; and based on the first optimization, providing a first signal strength map for the given wireless AP aligned to position coordinates.

16. A computer readable memory having stored therein instructions, that when executed by one or more processors, cause the one or more processors to perform functions comprising:

receiving traces of data, wherein respective data is collected by sensors of a device over a plurality of locations and over time periods, and wherein a respective trace of data includes received signal strength indication (RSSI) data for a plurality of wireless access points (AP);

selecting a set of traces and a given wireless AP among the traces of data for which data is indicative of a threshold amount of information to estimate a position of the device over the time periods and a position of the given wireless AP;

selecting first characteristics from the set of traces to remain constant and second characteristics from the set of traces to be variable;

selecting a localization constraint that provides one or more boundaries on the position of the device over the time periods and the position of the given wireless AP;

performing a simultaneous localization and mapping (SLAM) optimization of the position of the device and the position of the given wireless AP, over a plurality of iterations, based on the localization constraint with the first characteristics held constant and the second characteristics allowed to vary;

for the plurality of iterations, (i) selecting the set of traces based on the traces of data having an amount of GPS positioning data being less than a given amount of GPS positioning data in a previously selected set of traces, and (ii) performing the SLAM optimization based on the selected set of traces; and based on the iterative optimizations, providing an estimate of the position of the device over the time periods and an estimate of the position of the given wireless AP.

17. The computer readable memory of claim 16, wherein selecting the set of traces and the given wireless AP among the traces of data for which data is indicative of the threshold amount of information to estimate the position of the device over the time periods and the position of the given wireless AP comprises:

selecting the set of traces based on whether GPS data in the traces and relative position estimates of the device based on dead reckoning are matching.

18. A system comprising:

one or more processors;

data storage configured to store instructions that, when executed by the one or more processors, cause the system to perform functions comprising:

receiving traces of data, wherein respective data is collected by sensors of a device over a plurality of locations and over time periods, and wherein a respective trace of data includes received signal strength indication (RSSI) data for a plurality of wireless access points (AP);

selecting a set of traces and a given wireless AP among the traces of data for which data is indicative of a threshold amount of information to estimate a position of the device over the time periods and a position of the given wireless AP;

selecting first characteristics from the set of traces to remain constant and second characteristics from the set of traces to be variable;

selecting a localization constraint that provides one or more boundaries on the position of the device over the time periods and the position of the given wireless AP;

performing a simultaneous localization and mapping (SLAM) optimization of the position of the device and the position of the given wireless AP, over a plurality of iterations, based on the localization constraint with the first characteristics held constant and the second characteristics allowed to vary;

for the plurality of iterations, (i) selecting the set of traces based on the traces of data having an amount of GPS positioning data being less than a given amount of GPS positioning data in a previously selected set of traces, and (ii) performing the SLAM optimization based on the selected set of traces; and based on the iterative optimizations, providing an estimate of the position of the device over the time periods and an estimate of the position of the given wireless AP.

* * * * *